United States Patent [19]
Brodsky

[11] Patent Number: 6,122,634
[45] Date of Patent: Sep. 19, 2000

[54] FRACTAL NESTED LAYOUT FOR HIERARCHICAL SYSTEM

[75] Inventor: Stephen Andrew Brodsky, Los Gatos, Calif.

[73] Assignee: International Business Machines Corporation, Armonk, N.Y.

[21] Appl. No.: 08/850,337

[22] Filed: May 2, 1997

Related U.S. Application Data

[63] Continuation-in-part of application No. 08/747,415, Nov. 12, 1996, Pat. No. 5,893,913, application No. 08/747,414, Nov. 12, 1996, Pat. No. 6,011,559, application No. 08/747,416, Nov. 12, 1996, Pat. No. 5,917,498, application No. 08/747,057, Nov. 12, 1996, Pat. No. 5,907,706, application No. 08/747,058, Nov. 12, 1996, Pat. No. 5,983,016, and application No. 08/747,417, Nov. 12, 1996, Pat. No. 5,991,536.

[51] Int. Cl.[7] ...................................................... G06F 17/30
[52] U.S. Cl. ............................................................. 707/100
[58] Field of Search ..................................... 707/100, 102, 707/104, 500

[56] References Cited

U.S. PATENT DOCUMENTS

| | | | |
|---|---|---|---|
| 4,554,625 | 11/1985 | Otten .................................. | 364/474.13 |
| 5,212,771 | 5/1993 | Gane et al. ............................. | 345/357 |
| 5,341,466 | 8/1994 | Perlin et al. ........................... | 345/439 |
| 5,485,568 | 1/1996 | Venable et al. ......................... | 707/500 |

OTHER PUBLICATIONS

Microsoft (R)File Manager Version 4, 1981–1996, Microsoft Corporation. See 'screen dump' of 'File Manager' display of multi level hierarchical tree structure, with expanded nodes always above and to left of unexpanded nodes, at all accessed levels.

Copy of Search Report for United Kingdom Application No. GB 9807718.3 dated Jul. 23, 1998.

Microsoft Windows version 3.1 user's guide, Gateway Edition, pp. 91–138, 1992.

*Primary Examiner*—Anton W. Fetting
*Assistant Examiner*—Sanjiv Shah
*Attorney, Agent, or Firm*—Gates & Cooper

[57] ABSTRACT

The present invention discloses a method, apparatus, and article of manufacture for displaying a visual hierarchy of nodes. A top level node in the hierarchy is displayed as a window and lower level nodes are displayed within an area of the top level node. Lower level nodes are either expanded or unexpanded. Unexpanded lower level nodes are displayed in one area and expanded lower level nodes are displayed in another area. The unexpanded nodes conceal their contents and the expanded nodes disclose their contents, so that a visual hierarchy of nodes can be displayed a single display screen. The expanded nodes can contain several layers of lower level nodes that are visually formatted like the window.

21 Claims, 3 Drawing Sheets

FRACTAL NESTED LAYOUT FOR HIERARCHICAL SYSTEM

CROSS-REFERENCE TO RELATED APPLICATIONS

This application is a continuation-in-part of the following and commonly-assigned patent applications:

application Ser. No. 08/747,415, U.S. Pat. No. 5,893,913 entitled "METHOD FOR SYNCHRONIZING CLASSES, OBJECTS, ATTRIBUTES AND OBJECT PROPERTIES ACROSS AN OBJECT-ORIENTED SYSTEM," filed on Nov. 12, 1996, by Stephen A. Brodsky et al.;

application Ser. No. 08/747,414, U.S. Pat. No. 6,011,559 entitled "LAYOUT METHOD FOR ARC-DOMINATED LABELLED GRAPHS," filed on Nov. 12, 1996, by Dipayan Gangopadhyay, et al.;

application Ser. No. 08/747,416, U.S. Pat. No. 5,917,498 entitled "MULTI-OBJECT VIEWS IN AN OBJECT MODELING TOOL," filed on Nov. 12, 1996, by Roni Korenshtein;

application Ser. No. 08/747,057, U.S. Pat. No. 5,907,706 entitled "INTERACTIVE MODELING AGENT FOR AN OBJECT-ORIENTED SYSTEM," filed on Nov. 12, 1996, by Stephen A. Brodsky et al.;

application Ser. No. 08/747,058, U.S. Pat. No. 5,983,016 entitled "EXECUTION ENGINE IN AN OBJECT MODELING TOOL," filed on Nov. 12, 1996, by Stephen A. Brodsky et al.;

application Ser. No. 08/747,417, U.S. Pat. No. 5,991,536 entitled "NOTIFICATION MANAGER FOR OBJECT-ORIENTED SYSTEMS," filed on Nov. 12, 1996, by Stephen A. Brodsky et al.;

all of which applications are incorporated by reference herein.

This application is also related to the following and commonly-assigned patent applications:

application Ser. No. 08/850,829, entitled "METHOD FOR SYNCHRONIZATION BETWEEN LINKS AND GROUP DEFINITIONS WITHIN AN OBJECT-ORIENTED SYSTEM," filed on same date herewith, by Stephen A. Brodsky, et al.;

application Ser. No.08/850,858, entitled "OBJECT OUTLINE VIEW FOR GROUPS WITHIN AN OBJECT-ORIENTED SYSTEM," filed on same date herewith, by Stephen A. Brodsky, et al.;

application Ser. No. 08/850,214, entitled "METHOD FOR SENDING A MESSAGE TO A GROUP AND THE GROUP BROADCASTS THE MESSAGE TO ITS MEMBERS OR REFERENCES WITHIN AN OBJECT-ORIENTED SYSTEM," filed on same date herewith, by Stephen A. Brodsky, et al.;

application Ser. No. 08/850,832, U.S. Pat. No. 5,895,472 entitled "CHANGE AND ACCOUNTING LOG FOR OBJECT-ORIENTED SYSTEMS," filed on same date herewith, by Stephen A. Brodsky, et al.;

application Ser. No. 08/850,838, U.S. Pat. No. 5,960,199 entitled "MODEL TRACE VIEW FOR OBJECT-ORIENTED SYSTEMS," filed on same date herewith, by Stephen A. Brodsky et al.;

application Ser. No. 08/850,847, entitled "REFERENCE ATTRIBUTES WITHIN AN OBJECT-ORIENTED SYSTEM," filed on same date herewith, by Stephen A. Brodsky et al.;

all of which applications are incorporated by reference herein.

BACKGROUND OF THE INVENTION

1. Field of the Invention

This invention relates generally to hierarchical systems, and in particular to a fractal nested layout for hierarchical systems.

2. Description of Related Art

Computer systems frequently organize data as hierarchical information structures. An example is a directory of files provided by a typical operating system. It usually contains a root directory, which consists of files and sub-directories. Each sub-directory also contains files and lower-level sub-directories. To aid a user in navigating between files and sub-directories, hierarchical structures are represented graphically as trees.

Similarly, object-oriented programming environments represent hierarchical data in a tree-like manner. In the case of a large hierarchy, this graphical representation occupies an area larger than can be displayed on most monitors. To navigate between objects, users must scroll up and down through several windows worth of data. Because each window shows only a portion of the tree, users may become confused about how a specific portion relates to the total hierarchical structure.

Thus, there is a need in the art for a graphical representation that displays a total hierarchical structure in a compact display area of a monitor.

SUMMARY OF THE INVENTION

To overcome the limitations in the prior art described above, and to overcome other limitations that will become apparent upon reading and understanding the present specification, the present invention discloses a method, apparatus, and article of manufacture for a fractal nested layout in a hierarchical system.

The present invention displays a visual hierarchy of nodes on a monitor connected to a computer. The present invention comprises the steps or elements of displaying a top level node in the hierarchy as a window on the monitor and displaying several lower level nodes within an area of the top level node. Lower level nodes are either expanded or unexpanded. The unexpanded lower level nodes are displayed in one area and the expanded lower level nodes are displayed in another area. The unexpanded nodes conceal their contents and the expanded node disclose their contents. The expanded nodes can contain several layers of lower level nodes that are visually formatted like the window.

Various advantages and features of novelty which characterize the invention are pointed out with particularity in the claims annexed hereto and form a part hereof. However, for a better understanding of the invention and its advantages, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention comprises a hierarchical tool for displaying hierarchical information structures on a single display screen. More specifically, this hierarchical tool provides a fractal nested layout for displaying a hierarchical decomposition of a hierarchical model, wherein the hierarchy information is displayed on a monitor attached to a computer in a new, visually intuitive, manner. In the present invention, the hierarchy is comprised of a plurality of levels, wherein each level includes a set of nodes, and each node may contain a plurality of subnodes. Each subnode itself may contain a plurality of levels, wherein each of the levels may contain a plurality of subnodes. Examples of nodes include objects, folders, classes, packages, containers, archives, compressed/zip files, windows, lists, tables, notebooks, dialogs, groups, collections, indices, matrices, states, and diagrams.

A node is displayed either in an unexpanded or expanded manner. An unexpanded node hides its contents; an expanded node shows its contents, which are its subnodes. The subnodes of an expanded node may themselves be displayed in an unexpanded or expanded manner, as desired, on an individual basis. Alternatively, a node can be displayed in another format, such as a window, list or outline embedded in the expanded hierarchy. The user may zoom and fan the hierarchy. As subnodes are expanded, they themselves become nodes and thus show their contents as subnodes. In this manner, the user may "drill down" through the one or more levels at a time, until the lowest possible level in the hierarchy is itself displayed.

Nodes may also be links to other nodes. In the linked case, the linked nodes are followed. Any loops (expanding the same node twice) may be terminated by not expanding the node. This option may be exercised by the user or by a predetermined configuration.

Incidentally, nodes need not be homogenous in their representation. For instance, it is possible to mix objects and folders in a single hierarchy.

Hardware Environment

Figure 1:
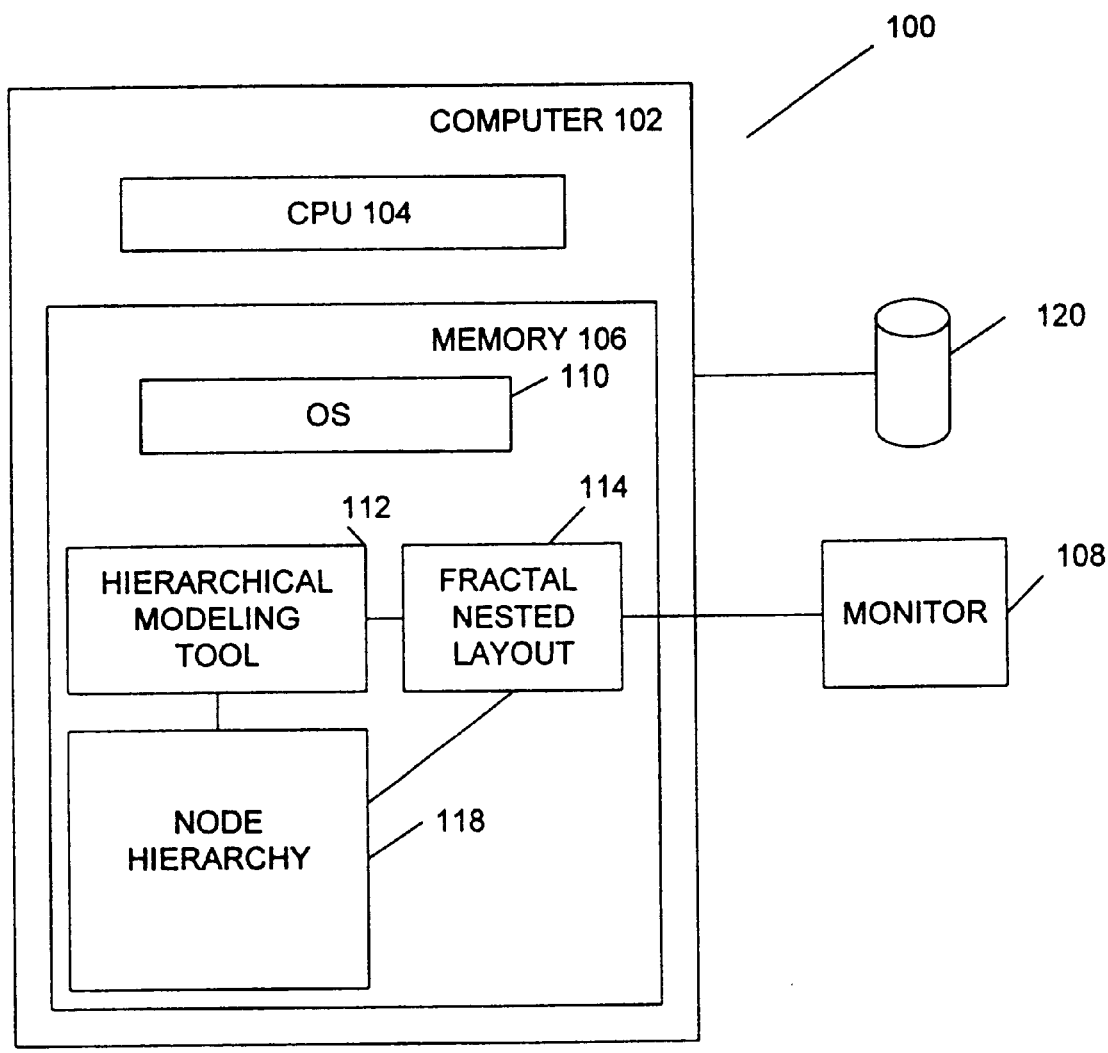
FIG. 1 illustrates an exemplary computer system that could be used to implement the present invention.

FIG. 1 illustrates an exemplary computer system 100 that could be used to implement the present invention. The computer 102 comprises a processor 104 and random access memory (RAM) 106. The computer 102 may be coupled to other devices, such as a monitor 108, a keyboard, a mouse device, a printer, etc. Of course, those skilled in the art will recognize that any combination of the above components, or any number of different components, peripherals, and other devices, may be used with the computer 102.

Generally, the computer 102 operates under the control of an operating system 110 stored in the memory 106. The present invention is preferably implemented using one or more data structures and computer programs operating under the control of the operating system 110. More specifically, the present invention comprises a hierarchical modeling tool 112 which operates under the control of the operating system 110. This hierarchical modeling tool generates a fractal nested layout 114 that includes a node hierarchy 118.

In the preferred embodiment, the operating system 110, the hierarchical modeling tool 112, the fractal nested layout 114, and the node hierarchy 118 are tangibly embodied in a computer-readable medium, e.g., random access memory 106 or data storage device 120, which could include one or more fixed or removable data storage devices, such as a removable cartridge drive, floppy disc drive, hard drive, CD-ROM drive, tape drive, etc. Further, the operating system 110 and the hierarchical modeling tool 112 are both comprised of instructions which, when read and executed by the computer 102, causes the computer 102 to perform the steps necessary to implement and/or use the present invention. Similarly, the fractal nested layout 114, and node hierarchy 118 are all comprised of data which are used by or generated by the hierarchical modeling tool 112 to accomplish the present invention. Of course, those skilled in the art will recognize many modifications may be made to this configuration without departing from the scope of the present invention.

Fractal Nested Layout

Figure 2:
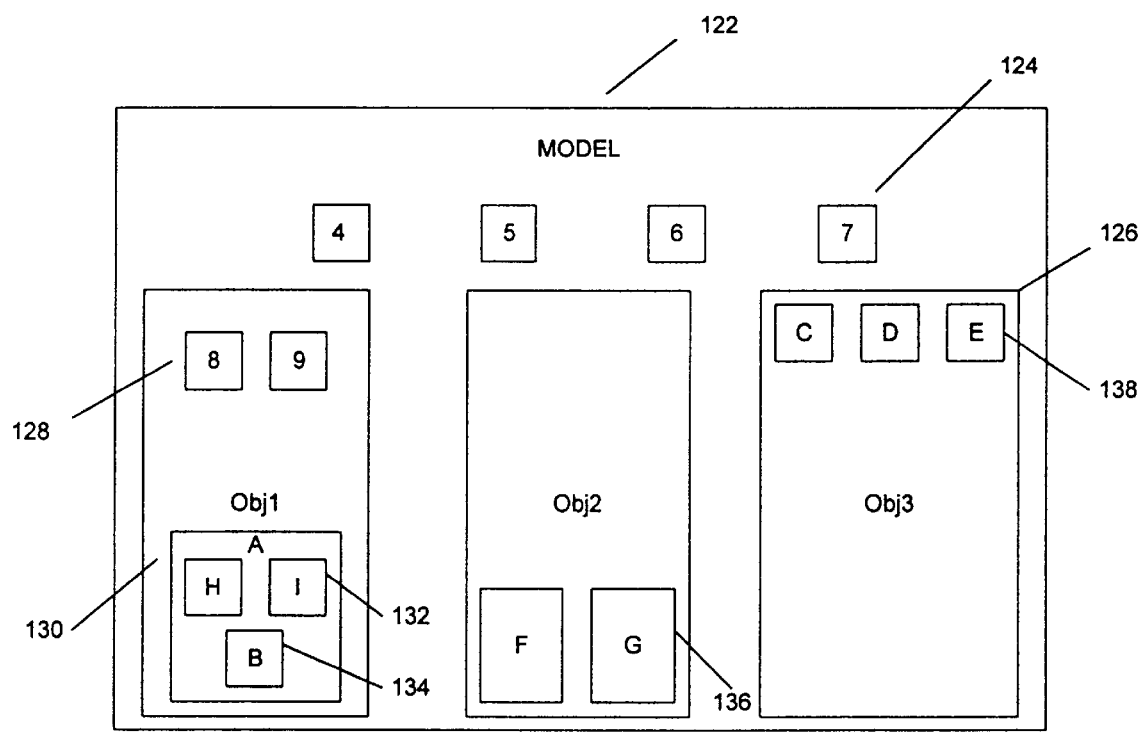
FIG. 2 is a block diagram that illustrates the display of a fractal nested layout according to the present invention.

FIG. 2 is a block diagram that illustrates the display of a fractal nested layout 114 according to the present invention. The data displayed on the monitor 108 attached to the computer 100 is described as a fractal nested layout 114 because of the regularity of the layout 114 at each level of the hierarchy. Each level of the layout is divided into two sections, an unexpanded node section and an expanded node section. Expanded nodes are divided into two sections, unexpanded and expanded. The unexpanded and expanded regions have the same spatial position at each level of the hierarchy. This provides the visual regularity of the layout 114 and enables the intuitive understanding of the hierarchy. For example, the unexpanded region could be the top half of each expanded node, and the expanded region could be the bottom half of each expanded node. The proportion between the expanded and unexpanded regions do not have to remain rigidly fixed so long as the relative positions of the two regions are consistently maintained.

In the example of FIG. 2, the object model 122 contains four unexpanded nodes ("4", "5", "6", and "7") 124, and three expanded nodes ("Obj1", "Obj2", "Obj3") 126. The top half of model 122 shows the unexpanded nodes 124 as opaque black boxes, visually enhancing the effect of the unexpanded aspect. The depth of an unexpanded node could be shown to indicate the number of levels graphically with color, shading or with a number.

The bottom half of the model shows the contents of the three expanded nodes 126. The expanded nodes 126 are shown here as outlined boxes, visually enhancing the expanded aspect. Graphical icons could also be used to visually enhance the aspects of expansion and unexpansion. "Obj1" contains two unexpanded subnodes ("8", "9") 128 and one expanded subnode ("A") 130, which further contains two unexpanded subnodes ("H", "I") 132 and one expanded subnode ("B") 134 which contains zero subnodes. "Obj2" contains zero unexpanded subnodes and two expanded subnodes ("F", "G") 136, each of which contain zero subnodes. "Obj3" contains three unexpanded subnodes ("C", "D", "E") 138 and zero expanded subnodes.

As described above, the hierarchy is comprised of a plurality of levels, wherein each level includes a set of nodes, and each node may contain a plurality of subnodes. Each subnode itself may contain a plurality of levels, wherein each of the levels may contain a plurality of subnodes. As subnodes are expanded, they themselves become nodes and thus show their contents as subnodes. In this manner, the user may "drill down" through the plurality of levels to display more information concerning the hierarchy, until the lowest possible level in the hierarchy is itself displayed.

Flowchart

Figure 3:
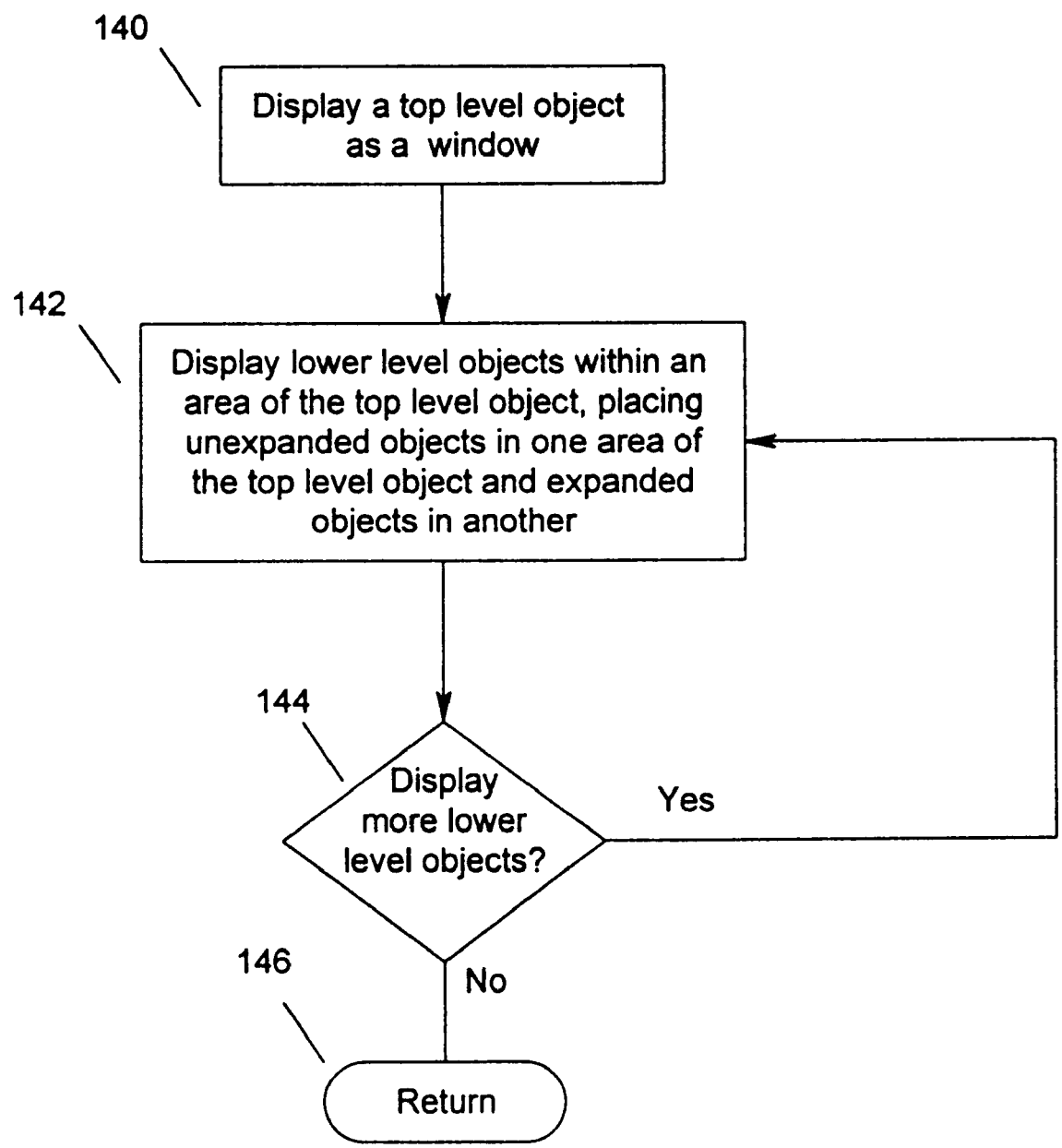
FIG. 3 is a flowchart illustrating the operation of the present invention.

FIG. 3 is a flowchart illustrating the operation of the present invention.

Block 140 represents the computer 100 displaying a top level object as a window on the monitor 108 attached to the computer 100.

Block 142 represents the computer 100 displaying lower level objects within an area of the top level object. Lower level objects may include both expanded and unexpanded objects, wherein expanded objects disclose their contents and unexpanded objects conceal their contents. Similarly, an expanded object's lower level objects can be unexpanded or expanded individually.

Block 144 is a decision block that represents the computer 100 determining whether other lower levels of objects should be displayed. If the computer detects the maximum depth, then the expansion display is terminated. The expanded objects can contain a plurality of levels, each containing one or more objects, that the computer 100 visually formats like the model 122.

If additional lower levels of objects are to be displayed, control returns to Block 142; otherwise, if no lower levels of objects are to be displayed or no lower levels exist, control is transferred to Block 146 because a completed fractal nested layout has been achieved. The transition from Block 144 to Block 142 is a function call which is returned from when Block 146 is reached.

Conclusion

This concludes the description of the preferred embodiment of the invention. The present invention discloses a method, apparatus, and article of manufacture for a fractal nested layout in an hierarchical system. The system includes unexpanded or expanded nodes that represent a hierarchical information structure. If a preferred depth is reached, the expansion display may be optionally terminated.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for displaying a visual hierarchy of nodes as a fractal nested layout on a monitor connected to a computer, comprising the steps of:

(a) displaying a higher level node in the hierarchy as a window on the monitor; and (b) simultaneously displaying a plurality of lower level nodes as nested and separate regions within an area of the window of the higher level node thereby displaying a fractal nested layout, wherein the lower level nodes comprise a plurality of levels within the visual hierarchy, so that a plurality of unexpanded lower level nodes are displayed opaquely in a first area within the display of the higher level node and a plurality of expanded lower level nodes are displayed as windows in a second area within the display of the higher level node, wherein the unexpanded lower level nodes conceal their contents and the expanded lower level nodes disclose their contents, wherein the visual hierarchy of nodes is a consistent display of the higher and lower level nodes having regularity of the layout at each level of the hierarchy, wherein the expanded lower level nodes are visually formatted like the higher level node and the first and second areas have the same relative spatial positions in the layout at each level of the hierarchy and wherein all nodes of the hierarchy are displayed in a single pane of the window of the higher level node, and the spatial relationship between displayed nodes in the fractal nested layout is indicative of the relationship between nodes in the hierarchy.

2. The method of claim 1, comprising the further step of selectively expanding and unexpanding the lower level nodes.

3. The method of claim 1, wherein the nodes may represent objects, folders, classes, packages, containers, archives, compressed files, windows, lists, tables, notebooks, dialogs, groups, collection, indices, matrices, states, and diagrams.

4. The method of claim 1, wherein the nodes are heterogeneous in their representation.

5. The method of claim 1, wherein the nodes in a first hierarchy may be linked to nodes in a second hierarchy.

6. The method of claim 1, wherein the displayed unexpanded nodes comprise a graphical representation that indicates the number of levels contained within the unexpanded nodes.

7. The method of claim 1, wherein the displayed expanded nodes comprise a graphical representation that is distinct from the unexpanded nodes.

8. A computerized apparatus for displaying a visual hierarchy of nodes as a fractal nested layout, comprising:

(a) means, performed by the computer, for displaying a higher level node in the hierarchy as a window on the monitor;

(b) means, performed by the computer, for simultaneously displaying a plurality of lower level nodes as nested and separate regions within an area of the window of the higher level node thereby displaying a fractal nested layout, wherein the lower level nodes comprise a plurality of levels within the visual hierarchy, so that a plurality of unexpanded lower level nodes are displayed opaquely in a first area within the display of the higher level node and a plurality of expanded lower level nodes are displayed as windows in a second area within the display of the higher level node, unexpanded nodes being nodes that conceal their contents and expanded nodes being nodes that disclose their contents, wherein the visual hierarchy of nodes is a consistent display of the higher and lower level nodes having regularity of the layout at each level of the hierarchy, wherein the expanded lower level nodes are visually formatted like the higher level node and the first and second areas have the same relative spatial positions in the layout at each level of the hierarchy, and wherein all nodes of the hierarchy are displayed in a single pane of the window of the higher level node, and the spatial relationship between displayed nodes in the fractal nested layout is indicative of the relationship between nodes in the hierarchy.

9. The apparatus of claim 8, comprising the further step of selectively expanding and unexpanding nodes.

10. The apparatus of claim 8, wherein the nodes may represent objects, folders, classes, packages, containers, archives, compressed files, windows, lists, tables, notebooks, dialogs, groups, collection, indices, matrices, states, and diagrams.

11. The apparatus of claim 8, wherein the nodes are heterogeneous in their representation.

12. The apparatus of claim 8, wherein the nodes in a first hierarchy may be linked to nodes in a second hierarchy.

13. The apparatus of claim 8, wherein the displayed unexpanded nodes comprise a graphical representation that indicates the number of levels contained within the unexpanded nodes.

14. The apparatus of claim 8, wherein the displayed expanded nodes comprise a graphical representation that is distinct from the unexpanded nodes.

15. An article of manufacture comprising a program storage medium readable by a computer having a memory, the medium tangibly embodying one or more programs of instructions executable by the computer to perform method steps for displaying a visual hierarchy of nodes as a fractal nested layout, the method comprising the steps of:

(a) displaying a higher level node in the hierarchy as a window on the monitor;

(b) simultaneously displaying a plurality of lower level nodes as nested and separate regions within an area of the window of the higher level node thereby displaying a fractal nested layout, wherein the lower level nodes comprise a plurality of levels within the visual hierarchy, so that a plurality of unexpanded lower level nodes are displayed opaquely in a first area within the display of the higher level node and a plurality of expanded lower level nodes are displayed as windows in a second area within the display of the higher level node, unexpanded lower level nodes being nodes that conceal their contents and expanded nodes being nodes that disclose their contents, wherein the visual hierarchy of nodes is a consistent display of the higher and lower level nodes having regularity of the layout at each level of the hierarchy, wherein the expanded lower level nodes are visually formatted like the higher level node and the first and second areas have the same relative spatial positions in the layout at each level of the hierarchy, and wherein all nodes of the hierarchy are displayed in a single pane of the window of the higher level node, and the spatial relationship between displayed nodes in the fractal nested layout is indicative of the relationship between nodes in the hierarchy.

16. The article of manufacture of claim 15, comprising the further step of selectively expanding and unexpanding nodes.

17. The article of manufacture of claim 15, wherein the nodes may represent objects, folders, classes, packages, containers, archives, compressed files, windows, lists, tables, notebooks, dialogs, groups, collection, indices, matrices, states, and diagrams.

18. The article of manufacture of claim 15, wherein the nodes are heterogeneous in their representation.

19. The article of manufacture of claim 15, wherein the nodes in a first hierarchy may be linked to nodes in a second hierarchy.

20. The article of manufacture of claim 15, wherein the displayed unexpanded nodes comprise a graphical representation that indicates the number of levels contained within the unexpanded nodes.

21. The article of manufacture of claim 15, wherein the displayed expanded nodes comprise a graphical representation that is distinct from the unexpanded nodes.

* * * * *